United States Patent
Tuszkiewicz et al.

(10) Patent No.: US 10,647,079 B2
(45) Date of Patent: May 12, 2020

(54) METHOD OF ULTRASONICALLY BONDING PAPERBOARD

(71) Applicant: General Mills, Inc., Minneapolis, MN (US)

(72) Inventors: George A Tuszkiewicz, Plymouth, MN (US); David W Jordan, Big Lake, MN (US); Thomas Miller, Maple Grove, MN (US); Peter L Novotny, Crystal, MN (US); Jenna M Ronquillo, Woodbury, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 16/467,348

(22) PCT Filed: Dec. 8, 2016

(86) PCT No.: PCT/US2016/065594
§ 371 (c)(1),
(2) Date: Jun. 7, 2019

(87) PCT Pub. No.: WO2018/106243
PCT Pub. Date: Jun. 14, 2018

(65) Prior Publication Data
US 2020/0070462 A1 Mar. 5, 2020

(51) Int. Cl.
*B32B 37/00* (2006.01)
*B31F 5/00* (2006.01)
*B29C 65/08* (2006.01)

(52) U.S. Cl.
CPC .............. *B31F 5/008* (2013.01); *B29C 65/08* (2013.01)

(58) Field of Classification Search
CPC ......... B31F 5/008; B32B 37/00; B29C 65/08; B29C 65/082; B29C 65/087
USPC ........................................................ 156/73.1
See application file for complete search history.

(56) References Cited

U.S. PATENT DOCUMENTS

| | | |
|---|---|---|
| 3,222,235 A | 12/1965 | Buchner |
| 3,505,136 A | 4/1970 | Attwood |
| 3,652,354 A | 3/1972 | Su |
| 3,886,017 A | 5/1975 | Brugh, Jr. et al. |
| 4,109,353 A | 8/1978 | Mitchell et al. |
| 4,605,454 A | 8/1986 | Sayovitz et al. |

(Continued)

FOREIGN PATENT DOCUMENTS

| | | |
|---|---|---|
| WO | WO 1999/025547 | 5/1999 |
| WO | WO 2016/087846 | 6/2016 |

*Primary Examiner* — James D Sells
(74) *Attorney, Agent, or Firm* — Diederiks & Whitelaw, PLC; John L. Crimmins, Esq.

(57) ABSTRACT

In a method of ultrasonically bonding paperboard, first and second pieces of paperboard are supplied, with at least one of the first and second pieces of paperboard being provided with a clay coating. The first and second pieces of paperboard are moistened and positioned in a gap between a sonotrode and an anvil of an ultrasonic welding unit. The ultrasonic welding unit is activated and the first and second pieces of paperboard are compressed between 30-70%, more preferably between 40-60%, to cause the clay coating to mobilize and force the clay coating material into fiber matrixes of the first and second pieces of paperboard, followed by cooling of the first and second pieces of paperboard, to bond the first and second pieces of paperboard.

11 Claims, 1 Drawing Sheet

(56) References Cited

U.S. PATENT DOCUMENTS

| | | | |
|---|---|---|---|
| 4,747,894 A | 5/1988 | Johnston et al. | |
| 5,114,509 A | 5/1992 | Johnston et al. | |
| 5,514,308 A | 5/1996 | Cohen et al. | |
| 5,620,545 A * | 4/1997 | Braun | A62B 23/02 |
| | | | 156/205 |
| 6,450,393 B1 | 9/2002 | Doumanidis et al. | |
| 6,740,018 B2 | 5/2004 | Heide | |
| 7,220,331 B2 | 5/2007 | Gmeiner | |
| 8,011,559 B2 | 9/2011 | Cai et al. | |
| 9,399,330 B2 | 7/2016 | Wieduwilt | |
| 9,399,332 B2 | 7/2016 | Wieduwilt | |
| 2004/0163754 A1 | 8/2004 | Nowicki et al. | |
| 2007/0003725 A1 | 1/2007 | Yousif | |
| 2016/0311189 A1 | 10/2016 | Wieduwilt et al. | |

\* cited by examiner

METHOD OF ULTRASONICALLY BONDING PAPERBOARD

CROSS-REFERENCE TO RELATED APPLICATIONS

This application represents a National Phase application of International Patent Application No. PCT/US2016/065594, filed Dec. 8, 2016, entitled "Method of Ultrasonically Bonding Paperboard", pending. The entire contents of this application is incorporated herein by reference.

BACKGROUND OF THE INVENTION

The present invention pertains to paperboard and, more particularly, to methods for producing paperboard.

Paperboard has a variety of uses. For example, paperboard can be used to make packaging for food products. Typically, the fabrication of paperboard packaging requires the use of adhesives. As is known in the art, both hot and cold adhesive systems can be used. The need for adhesives increases the cost of fabricating paperboard. Accordingly, it would be desirable to be able to fabricate paperboard without the use of added adhesives.

SUMMARY OF THE INVENTION

The present invention is directed to a method of ultrasonically bonding paperboard. First and second pieces of paperboard are supplied. At least one of the first and second pieces of paperboard is provided with a clay coating. The first and second pieces of paperboard are moistened and positioned in a gap between a sonotrode and an anvil of an ultrasonic welding unit. The ultrasonic welding unit is activated, and the first and second pieces of paperboard are compressed to bond the first and second pieces of paperboard. The first and second pieces of paperboard are allowed to cool. Preferably, the moistening, positioning and activating steps occur continuously.

Activating the ultrasonic welding unit causes the clay coating to mobilize, and allowing the first and second pieces of paperboard to cool causes the clay coating to resolidify. Upon mobilization of the clay coating, the clay coating is forced into fiber matrixes of the first and second pieces of paperboard. Moistening the first and second pieces of paperboard causes starch from the first and second pieces of paperboard to gelatinize, and allowing the first and second pieces of paperboard to cool causes retrogradation of the starch.

In a preferred embodiment, the first and second pieces of paperboard, each establishing a layer of paperboard in the order of 0.012 to 0.040 inches thick, are moistened with water. The water is applied to the first and second pieces of paperboard as a thin layer, thereby avoiding soaking of the first and second pieces of paperboard. Preferably, the method is performed without added starch or adhesive. The first and second pieces of paperboard are compressed between 30 and 70% during activation of the ultrasonic welding unit. More preferably, the first and second pieces of paperboard are compressed between 40 and 60% during activation of the ultrasonic welding unit. The first and second pieces can be formed from various paperboard products, such as being selected from the group consisting of Kraft board, natural board, bleach board and recycled board. At least one of the first and second pieces of paperboard can also have an area provided with an aqueous coating associated with printing of the packaging.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention, which may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. In addition, any specific numerical value listed herein includes a margin of error of +/−5%. By way of example, a length of 0.100 inches includes lengths between 0.095 and 0.105 inches. Similarly, a range of 0.080-0.120 inches includes lengths between 0.076 and 0.126 inches. For numerical values expressed as percentages, the margin of error refers to the base numerical value. In other words, 20% means 19-21% and not 15-25%.

Figure 1:
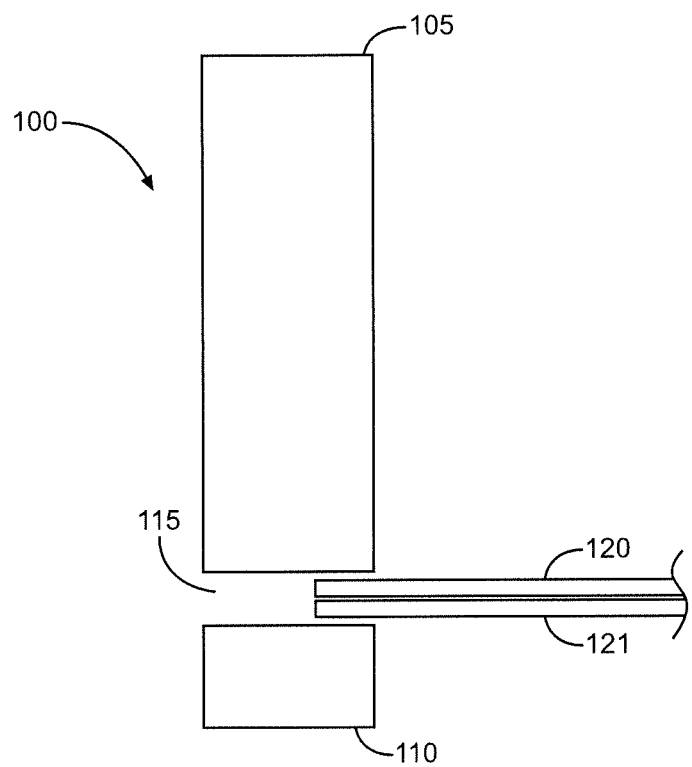
FIG. 1 is a schematic view of an ultrasonic welding unit usable in connection with the present invention.

With initial reference to FIG. 1, a schematic view of an ultrasonic welding unit 100 usable in connection with the present invention is provided. Welding unit 100 includes a sonotrode 105 and an anvil 110. The material to be welded passes through a gap 115 between sonotrode 105 and anvil 110. When ultrasonic welding unit 100 is activated, sonotrode 105 vibrates lengthwise while the material within gap 115 is compressed between sonotrode 105 and anvil 110. This results in the material being welded together. In the present invention, ultrasonic welding unit 100 is used to weld paperboard. Specifically, a first piece of paperboard 120 and a second piece of paperboard 121 are welded together. Preferably, pieces 120 and 121 are in the range of 0.012 to 0.040 inches thick and move continuously (i.e., non-intermittently) through gap 115 during the welding process. Although not shown, ultrasonic welding unit 100 typically also includes a power supply, a transducer and a controller.

Figure 2:
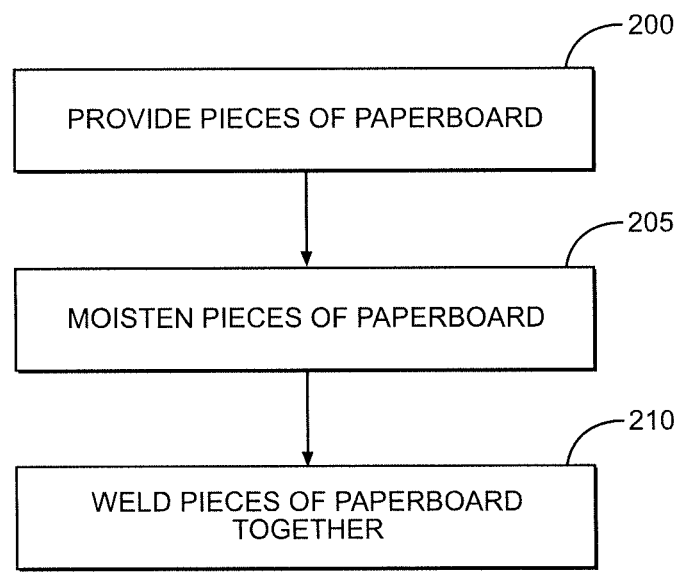
FIG. 2 is a schematic view of a process for producing paperboard in accordance with the present invention.

With reference now to FIG. 2, a schematic view of a process for producing paperboard in accordance with the present invention is provided. At step 200, first and second pieces of paperboard are provided (e.g., pieces 120 and 121). The pieces can be Kraft board, natural board, bleach board or recycled board, for example. At least one of the first and second pieces of paperboard has a clay coating (e.g., a clay/polymer coating). In addition, at least one of the first and second pieces can include an area provided with an aqueous coating.

At step 205, the first and second pieces of paperboard are moistened. Specifically, the surfaces of the first and second pieces are dampened. In particular, the first and second pieces are not soaked through. To accomplish this, a liquid is applied to the surfaces as a thin layer. In certain embodiments, water is used to moisten the paperboard. However, other liquids can be used.

At step 210, the first and second pieces of paperboard are passed through a gap between a sonotrode and an anvil of an ultrasonic welding unit (e.g., sonotrode 105 and anvil 110 of ultrasonic welding unit 100). The ultrasonic welding unit is active while the first and second pieces pass through the gap. Accordingly, the first and second pieces are welded together. Unlike many prior art paperboard fabrication methods, no supplemental bonding adhesives are employed. Instead, the clay coating and the moistening of the paperboard serve to form the bond between the first and second pieces. In particular, the ultrasonic welding operation causes the clay coating present on one or both of the first and second pieces to mobilize, and the clay coating is forced into fiber matrixes of the paperboard. In addition, the liquid (e.g., water) used to moisten the first and second pieces of paperboard mixes with the starch present in the paperboard, which leads to gelatinization of the starch. Preferably, no extra starch is added. In other words, the only starch used is the starch present in the paperboard. As the paperboard exits the ultrasonic welding unit, the paperboard begins to cool. Accordingly, the melted or liquefied coating resolidifies. Also, as the gelatinized starch cools, retrogradation takes place. As a result, a strong bond is formed between the first and second pieces of paperboard.

Preferably, steps 205 and 210 take place continuously (i.e., non-intermittently). During step 210, the first and second pieces of paperboard are compressed between the sonotrode and the anvil of the ultrasonic welding machine. The amount of compression is important to establish a strong bond through the clay and starch in accordance with the invention. Preferably, the first and second pieces are compressed by 30 to 70%. More preferably, the first and second pieces are compressed by 40 to 60%. This compression percentage refers to the amount that the thickness of the paperboard is changed from before to after welding. For example, if two pieces of paperboard have a combined thickness of 2.0 mm before welding and 1.2 mm after welding, then the pieces have been compressed by 40%. The degree of compression is important since too much compression damages the paperboard and too little compression does not result in a reliable bond being formed. Therefore, the combination of this compression, the clay coating and the water provides synergistic results in accordance with the invention, resulting in a strong bond between the sheets of paperboard.

Based on the above, it should be readily apparent that the present invention provides a way to produce paperboard, which remains in a compressed state in a bonded region, without the use of added adhesives. Although described with reference to preferred embodiments, it should be readily understood that various changes or modifications could be made to the invention without departing from the spirit thereof. In general, the invention is only intended to be limited by the scope of the following claims.

The invention claimed is:

1. A method of ultrasonically bonding paperboard comprising:
   supplying first and second pieces of paperboard, with at least one of the first and second pieces of paperboard being provided with a clay coating;
   moistening the first and second pieces of paperboard;
   positioning the first and second pieces of paperboard in a gap between a sonotrode and an anvil of an ultrasonic welding unit;
   activating the ultrasonic welding unit and compressing the first and second pieces of paperboard to cause the clay coating to mobilize and force the clay coating into fiber matrixes of the first and second pieces of paperboard in bonding the first and second pieces of paperboard, wherein the first and second pieces of paperboard are compressed between 30 and 70% during activation of the ultrasonic welding unit; and
   allowing the first and second pieces of paperboard to cool.

2. The method of claim 1, wherein:
   moistening the first and second pieces of paperboard causes starch from the first and second pieces of paperboard to gelatinize; and
   allowing the first and second pieces of paperboard to cool causes retrogradation of the starch.

3. The method of claim 2, wherein the first and second pieces of paperboard are moistened with water.

4. The method of claim 3, wherein the water is applied to the first and second pieces of paperboard as a thin layer, thereby avoiding soaking of the first and second pieces of paperboard.

5. The method of claim 4, wherein the first and second pieces of paperboard are in the order of 0.012 to 0.040 inches thick.

6. The method of claim 2 performed without added starch.

7. The method of claim 2 performed without added adhesive.

8. The method of claim 1, wherein the first and second pieces of paperboard are compressed between 40 and 60% during activation of the ultrasonic welding unit.

9. The method of claim 1, wherein the moistening, positioning and activating steps occur continuously.

10. The method of claim 1, wherein the first and second pieces of paperboard are selected from the group consisting of Kraft board, natural board, bleach board and recycled board.

11. The method of claim 1, wherein at least a portion of one of the first and second pieces of paperboard is further provided with an aqueous coating.

* * * * *